(12) United States Patent
Issa et al.

(10) Patent No.: US 7,940,534 B2
(45) Date of Patent: May 10, 2011

(54) RESONANT TRANSFORMER SYSTEMS AND METHODS OF USE

(75) Inventors: Anthony Francis Issa, Orlando, FL (US); Jeffrey Messer, San Bernadino, CA (US); John Michael Tobias, Toms River, NJ (US)

(73) Assignee: Extremely Ingenious Engineering, Orlando, FL (US)

( * ) Notice: Subject to any disclaimer, the term of this patent is extended or adjusted under 35 U.S.C. 154(b) by 258 days.

(21) Appl. No.: 12/313,792

(22) Filed: Nov. 25, 2008
(Under 37 CFR 1.47)

(65) Prior Publication Data

US 2009/0303760 A1     Dec. 10, 2009

Related U.S. Application Data

(60) Provisional application No. 61/004,373, filed on Nov. 27, 2007.

(51) Int. Cl.
*H02M 3/335* (2006.01)
(52) U.S. Cl. .................................. 363/21.02
(58) Field of Classification Search ............ 363/21.02, 363/21.03; 323/355, 356, 357, 358
See application file for complete search history.

(56) References Cited

U.S. PATENT DOCUMENTS

| | | | |
|---|---|---|---|
| 514,168 A | 2/1894 | Tesla |
| 593,138 A | 11/1897 | Tesla |
| 645,576 A | 3/1900 | Telsa |
| 649,621 A | 5/1900 | Tesla |
| 685,953 A | 11/1901 | Tesla |
| 685,954 A | 11/1901 | Tesla |
| 685,955 A | 11/1901 | Tesla |
| 685,956 A | 11/1901 | Tesla |
| 685,957 A | 11/1901 | Tesla |
| 685,958 A | 11/1901 | Tesla |
| 787,412 A | 4/1905 | Tesla |
| 1,119,732 A | 12/1914 | Tesla |
| 2,205,204 A | 6/1938 | King |
| 3,432,664 A | 3/1969 | Robison |
| 3,758,869 A | 9/1973 | Wagner |
| 3,781,647 A | 12/1973 | Glaser |
| 3,909,736 A | 9/1975 | Huchital et al. |
| 4,379,253 A | 4/1983 | Myer |
| 4,485,426 A | 11/1984 | Kerls |
| 4,685,047 A | 8/1987 | Phillips, Sr. |
| 4,717,889 A | 1/1988 | Engelmann |
| 4,727,297 A | 2/1988 | Wolze |
| 4,872,100 A | 10/1989 | Diaz |
| 4,916,379 A | 4/1990 | Wand et al. |
| 4,937,832 A | 6/1990 | Rocca |
| 4,945,721 A | 8/1990 | Cornwell et al. |

(Continued)

OTHER PUBLICATIONS

International Preliminary Report for PCT/US2008/007655 dated Jan. 7, 2010.

(Continued)

*Primary Examiner* — Gary L Laxton
*Assistant Examiner* — LaKaisha Jackson
(74) *Attorney, Agent, or Firm* — Milbank Tweed Hadley & McCloy LLP

(57) ABSTRACT

Resonant transformer systems and methods of use are described. One aspect may include a primary winding, a secondary winding, and at least one output winding. In further aspects, a transformer may be coupled to the secondary winding. In one aspect, the output winding is coupled to rectifying circuitry, which may be coupled to one or more capacitors.

22 Claims, 8 Drawing Sheets

U.S. PATENT DOCUMENTS

| | | | |
|---|---|---|---|
| 4,956,579 | A | 9/1990 | Albright |
| 4,963,792 | A | 10/1990 | Parker |
| 4,969,078 | A * | 11/1990 | Yamamoto et al. ............. 363/24 |
| 5,103,366 | A | 4/1992 | Battochi |
| 5,173,643 | A | 12/1992 | Sullivan et al. |
| 5,225,623 | A | 7/1993 | Krasnow |
| 5,276,281 | A | 1/1994 | Sato et al. |
| 5,281,898 | A | 1/1994 | Albright |
| 5,739,997 | A | 4/1998 | Gross |
| 5,818,180 | A | 10/1998 | Canclini |
| 5,841,239 | A | 11/1998 | Sullivan et al. |
| 5,864,212 | A | 1/1999 | Sullivan |
| 6,052,017 | A | 4/2000 | Pidutti et al. |
| 6,118,229 | A | 9/2000 | Lee |
| 6,166,869 | A | 12/2000 | Pidutti et al. |
| 6,198,335 | B1 | 3/2001 | Pakriswamy |
| 6,259,305 | B1 | 7/2001 | Pakriswamy |
| 6,272,694 | B1 | 8/2001 | Weaver et al. |
| 6,300,857 | B1 * | 10/2001 | Herwig .......................... 336/229 |
| 6,320,508 | B1 | 11/2001 | Giesler et al. |
| 6,522,089 | B1 | 2/2003 | Duong et al. |
| 6,549,044 | B2 | 4/2003 | Brambilla et al. |
| 6,798,716 | B1 | 9/2004 | Charych |
| 6,883,509 | B2 | 4/2005 | Porter et al. |
| 6,906,486 | B2 | 6/2005 | Berroth et al. |
| 6,906,495 | B2 * | 6/2005 | Cheng et al. .................. 320/108 |
| 6,911,848 | B2 | 6/2005 | Vinciarelli |
| 6,930,893 | B2 | 8/2005 | Vinciarelli |
| 6,934,166 | B2 | 8/2005 | Vinciarelli |
| 6,961,227 | B1 | 11/2005 | Whiton et al. |
| 7,027,311 | B2 | 4/2006 | Vanderillie et al. |
| 7,235,945 | B2 | 6/2007 | Correa et al. |
| 7,400,487 | B1 | 7/2008 | Bitar |
| 7,573,363 | B2 * | 8/2009 | Yamashita .................... 336/229 |
| 7,675,197 | B2 | 3/2010 | Tetlow |
| 2003/0011324 | A1 | 1/2003 | Lee |
| 2004/0248742 | A1 | 12/2004 | Terashima et al. |
| 2005/0046387 | A1 | 3/2005 | Aker et al. |
| 2005/0083059 | A1 | 4/2005 | Morita et al. |
| 2005/0148864 | A1 | 7/2005 | Slade et al. |
| 2005/0184689 | A1 | 8/2005 | Maslov et al. |
| 2006/0098378 | A1 | 5/2006 | Gross |
| 2006/0228548 | A1 | 10/2006 | Ayai et al. |
| 2007/0018629 | A1 * | 1/2007 | Potvin et al. .................. 323/304 |
| 2007/0075053 | A1 | 4/2007 | Smith et al. |
| 2007/0145018 | A1 | 6/2007 | Smith et al. |
| 2007/0195561 | A1 | 8/2007 | Suenaga et al. |
| 2007/0222426 | A1 | 9/2007 | Waffenschmidt et al. |
| 2007/0263415 | A1 | 11/2007 | Jansen et al. |

OTHER PUBLICATIONS

U.S. Appl. No. 12/288,586, filed Oct. 21, 2008, Issa, et al.
U.S. Appl. No. 12/152,545, filed May 15, 2008, Messer.
U.S. Appl. No. 12/152,525, filed May 15, 2008, Messer.
U.S. Appl. No. 12/214,655, filed Jun. 20, 2008, Issa.
U.S. Appl. No. 12/152,977, filed May 15, 2008, Messer.
U.S. Appl. No. 12/152,976, filed May 15, 2008, Messer.
U.S. Appl. No. 60/930,221, filed May 15, 2007, Messer, et al.
U.S. Appl. No. 60/936,506, filed Jun. 20, 2007, Messer, et al.
U.S. Appl. No. 61/004,373, filed Nov. 27, 2007, Messer, et al.
Tracy V. Wilson, How Wireless Power Works, www.howstuffworks.com, Nov. 20, 2008.
Minoru Watanabe, et al. A Study on High Temperature Superconductin Coil of Different Coil Arrangements, IEEE Transactions on Applied Superconductivity, Jun. 2007, vol. 17 No. 2.
Power Requirements for Cooling versus Temperature in Kelvin,www.metox.biz/super_roadmap, Jun. 8, 2008.
Cryostat, Wikipedia Encyclopedia,Jun. 1, 2008.
Resonator, Wikipedia Encyclopedia, Jun. 3, 2008.
Zenergy Receives Order for HTS Induction Heater, Semiconductor Week, Oct. 15, 2008, vol. 21 No. 18, Peregrine Communications.
Superconductivity Roadmap, www.metox.biz/super_roadmap, Jun. 8, 2008.
Miyagi, et al., AC Loss Characteristics of an assembled conductor of round Bi2223 Ag sheated wires, Elsivier Science B.V., Aug. 2002, vol. 372-376 Part 3 pp. 1727-1729.
Daumling, et al., Ac loss in superconducting power cables, Studies of High Temperature Superconductors, vol. 33.
O'Miura, et al, The development of a 2.5 T/100 kV A AC superconducting magnet using a high-J NbTi superconducting wire having Nb artificial pins, Supercond. Sci. Techno. Oct. 1993.
HTS-110 Leaders in HTS Magnetic Solutions, www.hts-110.co.nz, Jun. 8, 2008.
Michael Walker, et al., Performance of Coils Wound from Long Lengths of Surface-Coated, Reactedm BSCC0-2212 Conductor, IEEE Transactions on Applied Supercond. Jun. 1997, vol. 7 No. 2.
K. Hayashi, et al., Development of Ag-Sheated Bi2223 Superconducting Wires & Thier Applications, IEEE Transactions on Applied Superconductvity, Mar. 2001, vol. 11 No. 1.
A.B. Sneary,et al., Development og High Temperature Superconducting Coils Using Bi-2223/Ag Tapes, IEEE Transactions on Applied Superconductivity vol. 9 No. 2, Jun. 1999.
Mark S. Newson, et al., Progress on the Design and Operation of High-Tc Coils Using Dip-Coat BSCCO-2212/Ag Tape, IEEE Transactions on Applied Superconductivity, vol. 12 No. 1.
L. Bigoni, et al., Development of Bi-2223/Ag Tapes and Coils, IEEE Transactions on Applied Superconductivity, vol. 7 No. 2, Jun. 1997.
Pradeep Halder, et al., Developement of Bi-2223 HTS High Field Coils and Magnets, IEEE Transactions on Applied Superconductivity, Jun. 1995, vol. 5 No. 2.
PJ Masson, et al., HTS Machines as enabling technology for all-electric airborne vehicles, Superconductor Science & Technology, 2007, 748-756.
M. Ariante. et al., Characteristics of Coils wound with Mono and Multifilamentary Bi-2212/Ag from 4 to 80 K, IEEE Transactions on Magnetics vol. 32 No. 4, Jul. 1996.
Alexander Ilyusheckin, et al., Continuous Production of Bi-2212 Thick Film on Silver Tape, IEEE Transactions on Applied Superconductivity, vol. 9 No. 2, Jun. 1999.
Shinichi Nomura, et al., Helically Wound Coils for High Field Magnets, IEEE Transactions on Applied Superconductivity, vol. 14 No. 2, Jun. 2004.
Dan Combine, Radiant Energy and Over-Unity, Version 6, Oct. 2006.
Tomorrow's High-Temperature Superconducting Cables, www.innovations-report.com, Jun. 27, 2001.
Material Safety Data Sheet for SCS4050, SF12050, SF12100; High Temperature Superconductor Tape, Jun. 12, 2007, SuperPower Inc.
International Search Report for PCT/US2008/12013 dated Feb. 4, 2009.
International Search Report for PCT/US2008/06239 dated Aug. 26, 2008.
International Search Report for PCT/US2008/06176 dated Sep. 17, 2008.
International Search Report for PCT/US2008/13097 dated Feb. 4, 2009.
International Search Report for PCT/US2008/07655 dated Sep. 25, 2008.
Wireless Power Tesla Coil Demo, Last Accessed Sep. 14, 2009, http://www.youtube.com/watch?v=aG-We7A-i9U.
Issa, Anthony, Wireless Power Bus with Data Channel, NASA SBIR Technologies, Extremely Ingenious Engineering, Orlando FL.
NASA SBIR 2009 Phase 1 Form C-Budget Summary.
Issa, Anthony, Wireless Power Bus with Data Channel, Extremely Ingenious Engineering, LLC.
Wireless Data and/or Power Connectivity for Small Spacecraft, Extremely Ingenious Engineering.
Information about Principal Investigators/Project directors and co-Principal Investigators/co-Project Directors.
Page, Lewis, Lightning-gun tech approaching weaponisation, www.theregister.co.uk, Aug. 26, 2009.
Tobias, John, Experimental Studies of Wave Propagation in Three-Dimensional Photonic Crystals.
Tobias, John and Grebel H., Self-Imaging in photonic crystals in a subwavelength range, Optice Letters, Dec. 1, 1999, vol. 24, No. 23.
Tobias, John, Ajgaonkar M., Grebel H., Morphology-dependent transmission through photonic crystals, J. Opt. Soc.Am.B., Mar. 2002, vol. 19, No. 3.
Qels 2002, Tuesday Afternoon.
Mar. 15, 2010 Non-final Rejection for U.S. Appl. No. 12/152,976.

Apr. 16, 2010 Notice of Allowance, for U.S. Appl. No. 12/152,977.
Jul. 19, 2010 Notice of Allowance, for U.S. Appl. No. 12/152,977.
Aug. 26, 2010 Notice of Allowance, for U.S. Appl. No. 12/152,977.
Oct. 14, 2010 Ex Parte Quayle Action, for U.S. Appl. No. 12/288,586.
Nov. 5, 2010 Non-final Rejection, for U.S. Appl. No. 12/152,545.
Miniature Vacuum Tube Tesla Coil, Last accessed Nov. 17, 2009, www.capturedlightning.org/hot-streamer/electrontube/minivttc.htm.
MINITTC.bmp image, Last accessed Nov. 17, 2009, www.capturedlightning.org/hot-streamer/electrontube/minivttc.bmp.

Dec. 8, 2010 Response to Office Action, for U.S. Appl. No. 12/288,586.
Feb. 4, 2011 Notice of Allowance, for U.S. Appl. No. 12/288,586.
Feb. 11, 2011 Proposed Amendment After Notice of Allowance, for U.S. Appl. No. 12/288,586.
Feb. 15, 2011 Amendment After Notice of Allowance, for U.S. Appl. No. 12/288,586.
Mar. 1, 2011 Response to Amendment After Final, for U.S. Appl. No. 12/288,586.

* cited by examiner

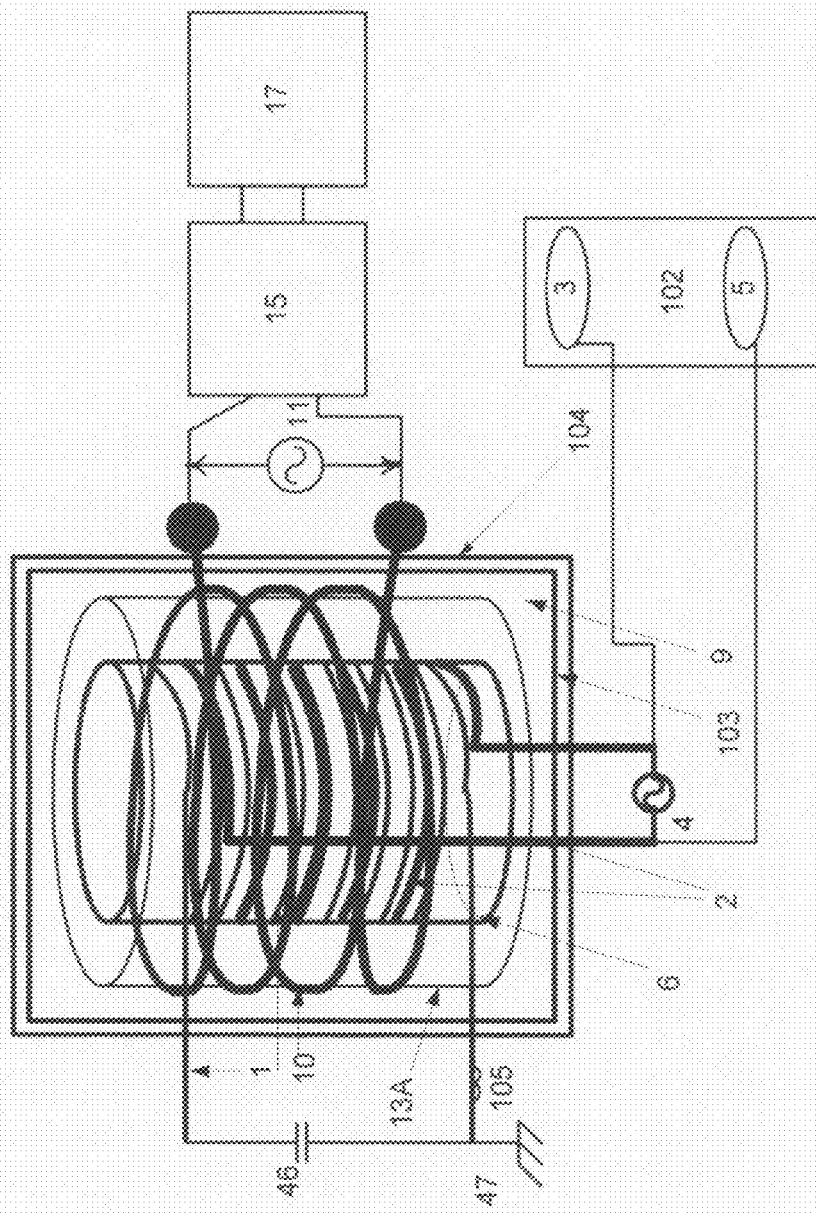

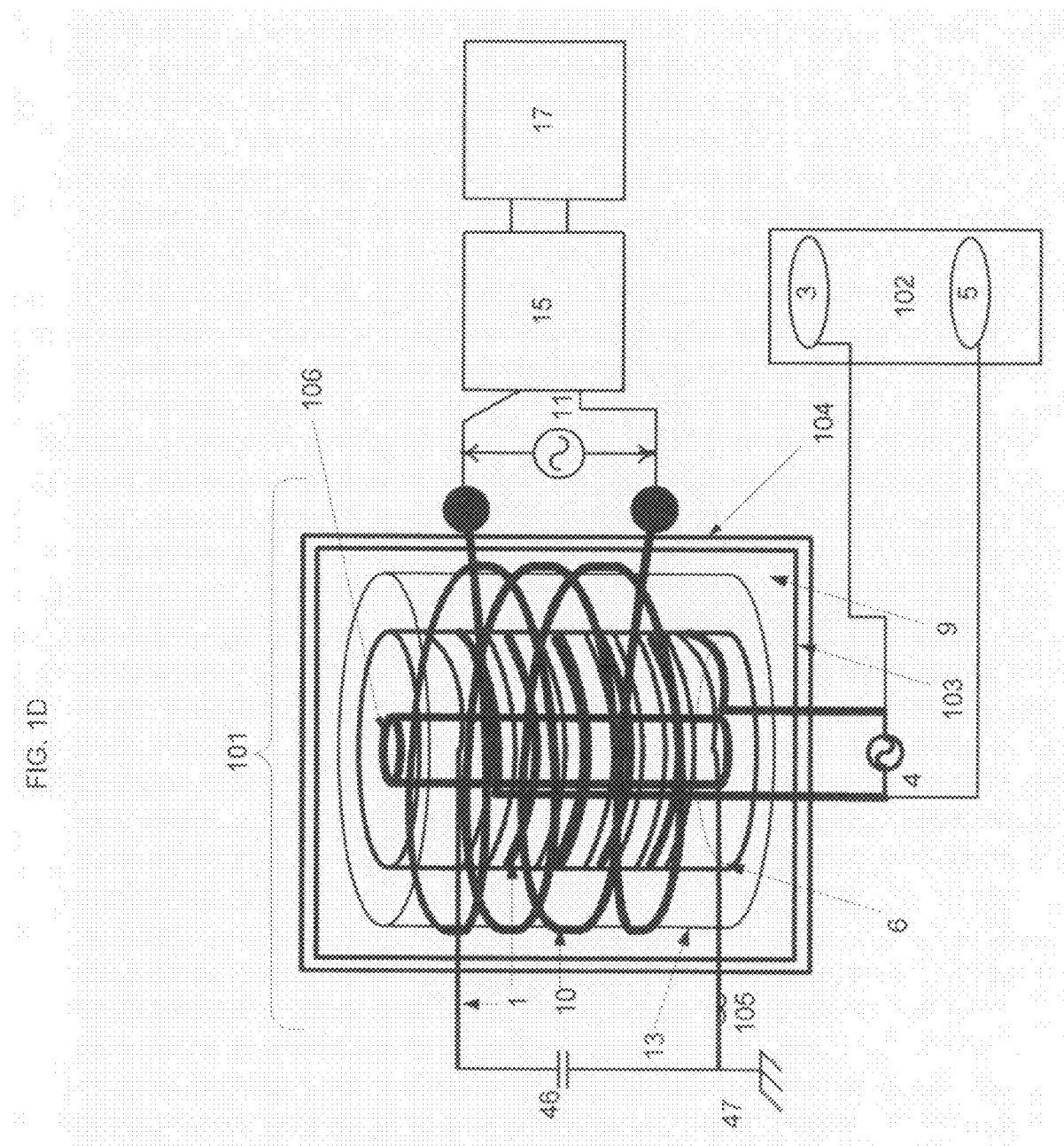

RESONANT TRANSFORMER SYSTEMS AND METHODS OF USE

This application claims the benefit of provisional patent application Ser. No. 61/004,373, filed Nov. 27, 2007. This application hereby incorporates by reference the entire contents of each of U.S. non-provisional patent application Ser. No. 12/288,586, titled "Methods and Systems for Wireless Energy and Data Transmission," filed Oct. 21, 2008; and U.S. non-provisional patent application Ser. No. 12/152,525, titled "System and Method for Controlling an Electromagnetic Field Generator," filed May 15, 2008.

FIELD OF THE INVENTION

The present invention relates to resonant transformer systems and methods of use.

BACKGROUND OF THE INVENTION

Transformers may be used to change voltages or isolate currents. Transformers may use electrical coils wounds around a common ferrous core to transfer power through magnetic field coupling. The core materials may limit the transformer's performance. Iron/ferrous transformers may be limited by the saturation point of the ferrous core, which, in turn limits power transfer. Limited power transfer from primary to secondary coils may result in limiting the power rating (typically specified in volt-amperes) of a given transformer. Power may also be lost in eddy currents and due to the core material which also heats the transformer device. Materials such as iron, ferrous metals, other metals, plastics and/or liquid, which may comprise transformer cores may limit the total power transfer from one coil to another. In addition, such transformers have increased weights attributable to the core material.

SUMMARY OF THE INVENTION

In certain aspects, the present invention may provide a method. In one aspect, the method may include initiating a first timing signal within a driver, inputting power to the driver, inducing an alternating current into a primary winding, wherein the alternating current is generated by the driver, electromagnetically coupling the primary winding to a secondary winding, storing energy, wherein the energy comprises an electric field between the plates of a secondary capacitor bank, generating a current on the secondary winding at a frequency governed by an RLC circuit, wherein the RLC circuit includes the secondary winding and the secondary capacitor bank, sensing the frequency of the current on the secondary winding, sending a second timing signal to the driver based on the frequency of the current on the secondary winding, wherein the driver provides the alternating current into the primary winding based on the second timing signal, electromagnetically coupling at least one output winding to the secondary winding, and outputting the alternating current from the output winding into a rectifying circuitry.

In one aspect, the present invention may provide for a resonant transformer system. The system may include a secondary winding wrapped around a core form and having first and second ends coupled to a secondary capacitor bank, wherein the core form is toroid-shaped with a gap, a primary winding wrapped around a primary form and having first and second ends coupled to a driver, wherein the primary form surrounds a portion of the core form, at least one output winding wrapped around an output form and having first and second ends coupled first and second inputs of a rectifying circuitry respectively, wherein a first output of the rectifying circuitry is coupled to one or more capacitors through a first terminal of the one or more capacitors and a second output of the rectifying circuitry is connected to the one or more capacitors through a second terminal of the one or more capacitors, and the output form surrounds a portion of the core form and a transformer coupled to the secondary winding.

Another aspect may include a secondary winding wrapped around a core form and having first and second ends coupled to a secondary capacitor bank, wherein the core form is cylinder-shaped, a primary winding wrapped around the inside of the core form and having first and second ends coupled to a driver, at least one output winding wrapped around an output form and having first and second ends coupled first and second inputs of a rectifying circuitry respectively, wherein a first output of the rectifying circuitry is coupled to one or more capacitors through a first terminal of the one or more capacitors and a second output of the rectifying circuitry is connected to the one or more capacitors through a second terminal of the one or more capacitors, and the output form surrounds a portion of the core form, and a transformer coupled to the secondary winding.

BRIEF DESCRIPTION OF THE DRAWINGS

Features and other aspects of embodiments of the present invention are explained in the following description taken in conjunction with the accompanying drawings, wherein:

FIG. 1C illustrates an interface of the driving system applied to a resonant transformer of the straight-form tesla coil type with rectifying circuitry and capacitor bank according to one aspect of the present invention;

FIG. 1D illustrates an interface of the driving system applied to a resonant transformer of the straight-form tesla coil type with high permeability material, rectifying circuitry, and capacitor bank according to one aspect of the present invention;

The drawings are exemplary, not limiting. It is intended for items that are labeled with the same number in multiple figures to refer to the same item throughout the figures. The drawings of the windings in the figures are not intended to show the exact number of turns or ratio of turns used in aspects of the present invention.

DETAILED DESCRIPTION

Various embodiments of the present invention will now be described in greater detail with reference to the drawings.

Figure 1A:
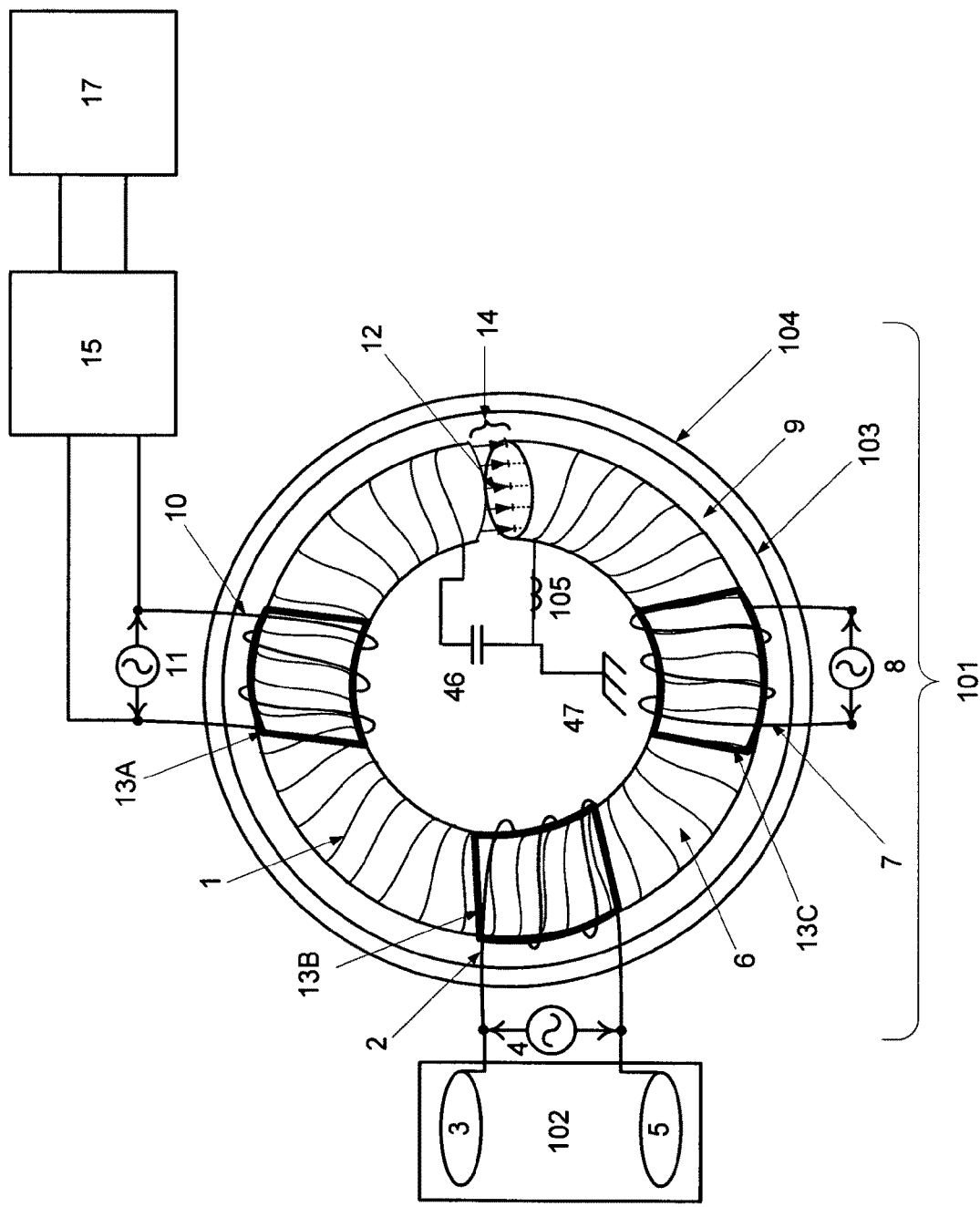
FIG. 1A illustrates an interface of the driving system applied to a resonant transformer of the toroidal tesla coil type with rectifying circuitry and capacitor bank according to one aspect of the present invention.

As shown in FIG. 1A, one aspect of the present invention may include solid state driving system 102 for inducing alternating current 4 onto primary winding 2. Alternating current 4 may electromagnetically couple secondary winding 1 to primary winding 2. In one aspect, magnetic flux 12 may be induced by the introduction of alternating current 4 to primary winding 2. In further aspects, alternating current 4 may electromagnetically couple output winding 10 or any other output windings wrapped around output forms, for example, as optional output winding 7 is wrapped around optional output form 13C. In further aspects, alternating current 4 may be converted to usable direct current via rectifying circuitry 15 and capacitor bank 17, which, in one aspect, are coupled to output winding 10.

Figure 3A:
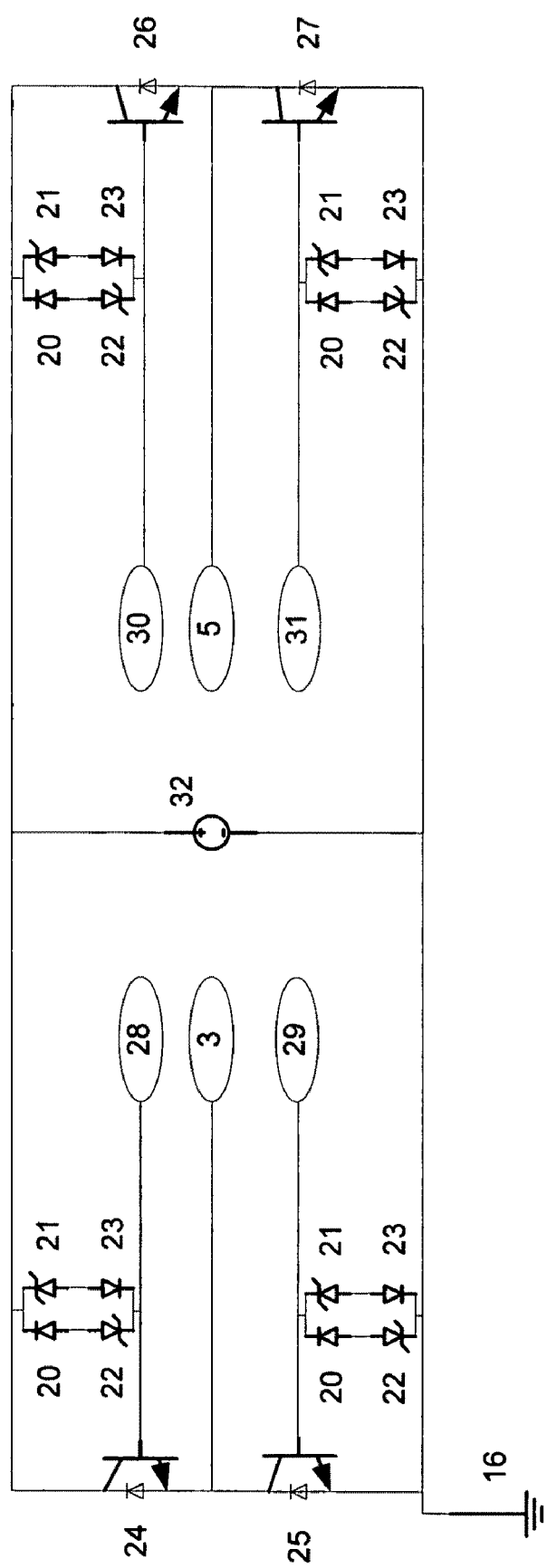
FIG. 3A illustrates a schematic of a driving system according to one aspect of the present invention.

In one aspect, solid state driving system 102 (as shown in FIG. 3A according to one aspect of the present invention) may be used. Other aspects may use driving circuitry described in U.S. non-provisional patent application Ser. No. 12/152,525 titled "System and Method for Controlling an Electromagnetic Field Generator," filed May 15, 2008. Other aspects may use driving circuitry described in U.S. non-provisional patent application Ser. No. 12/288,586 titled "Methods and Systems for Wireless Energy and Data Transmission," filed Oct. 21, 2008.

In one aspect, alternating current 4 may stimulate primary winding 2 and secondary winding 1 (ultimately, electromagnetically coupling output winding 10 and optional output winding 7), which may initiate a feedback signal. In further aspects, as resonant transformer 101 resonates at its characteristic frequency, the feedback signal may match the resonant frequency, in turn matching alternating current 4 of primary winding 2 to the resonant frequency. In further aspects, this frequency matching of alternating current 4 of primary winding 2 to the resonant frequency makes resonant transformer 101 self-driving, for example, requiring no external timing signal.

As shown in FIG. 1A, according to further aspects of the present invention, solid state driving system 102 may include solid state driving terminals 3 and 5, which may each be coupled to one end of primary winding 2, respectively. Primary winding 2 may be wrapped around primary form 13B such that primary winding 2 is helically coiled around primary form 13B. In further aspects, secondary winding 1 may be wrapped around secondary core form 6, such that secondary winding 1 is helically coiled around core form 6. In one aspect, core form 6 may be shaped as a toroid with gap 14 present (for example, core form 6 may be approximately C-shaped).

In further aspects, output winding 10 may be wrapped around output form 13A such that output winding 10 is helically coiled around output form 13A. In other aspects, optional output winding 7 may be wrapped around optional output form 13C, such that optional output winding 7 is helically coiled around optional output form 13C. In further aspects, other optional output windings (not shown) and optional output forms (not shown) may be used to, for example, output current. Optional output winding 7 may use rectifying circuitry 15 and capacitor bank 17 to convert alternating current 8 into direct current, if such conversion is desired.

Figure 1B:
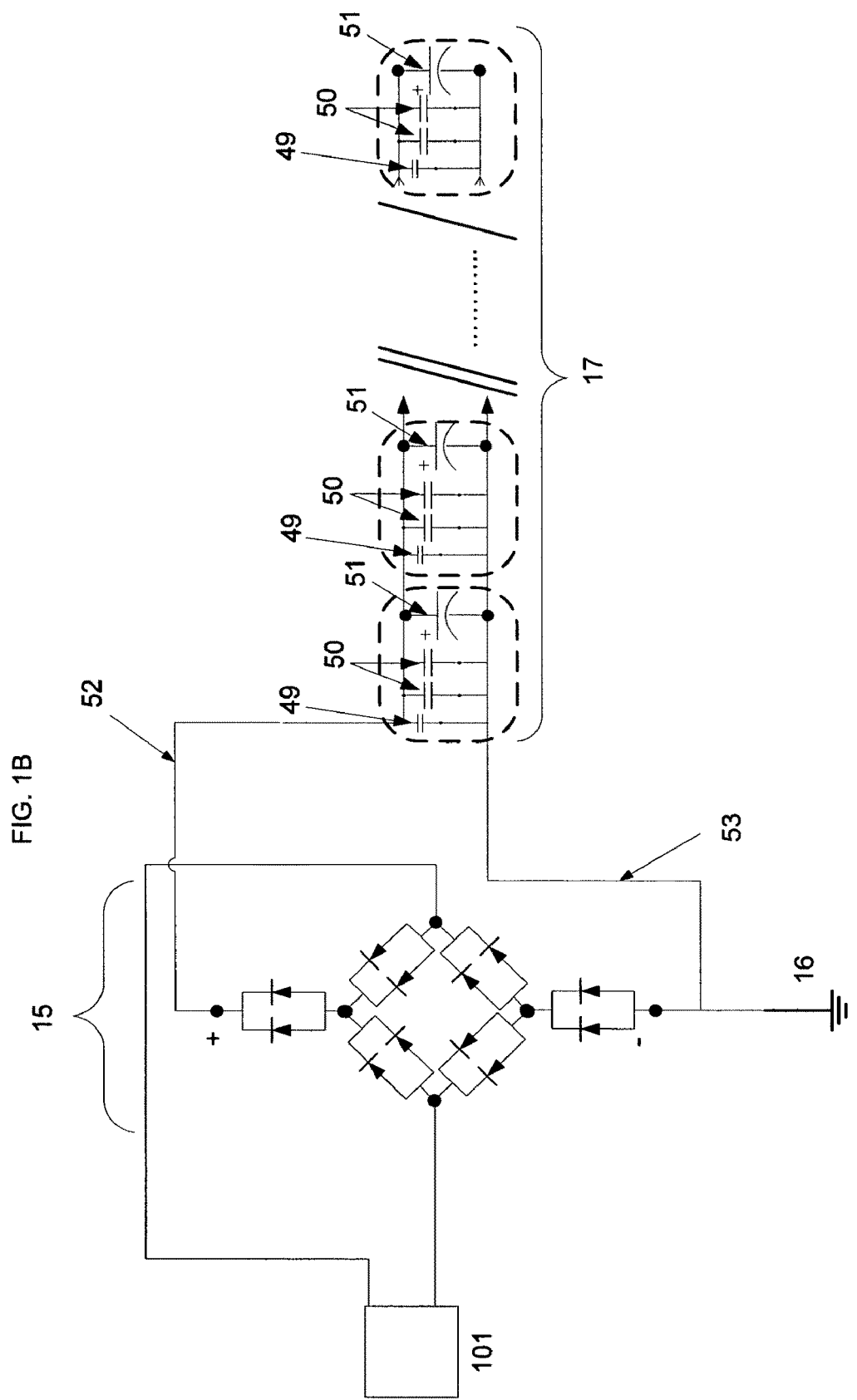
FIG. 1B illustrates rectifying circuitry and capacitor bank according to one aspect of the present invention.

In further aspects, output winding 10 may have each end coupled to diode array 15. As shown in FIG. 1B according to one aspect of the present invention, diode array 15 may be coupled to inputs of capacitor bank 17 through leads between the positive (+) and negative (−) outputs on diode array 15 and the positive (+) and negative (−) inputs on capacitor bank 17. In further aspects, the negative (−) output of diode array 15 may be coupled to ground 16.

In one aspect, direct current outputted from diode array 15 may be imperfect because of possible ripples. In one aspect, capacitor bank 17 may be a system of capacitors for the purpose of storing energy attached to diode array 15 and reducing ripples in the direct current outputted from diode array 15. In further aspects, capacitor bank 17 may have low inductance, high voltage capacitors. One aspect of capacitor bank 17 may include low inductance polymeric capacitor 50 and snubber capacitor 49 acting as filters connected in parallel to electrolytic capacitor 51 acting as a storage capacitor for fast charging and discharging of capacitors 49, 50, and 51. Low internal and external stray inductance may be achieved by minimizing the length of wires interconnecting capacitors 49, 50, and 51. In further aspects, minimizing and equalizing the inductance of leads 52 and 53 to capacitor bank 17 may be accomplished by ensuring the leads are of equal length and as short as possible.

In one aspect, outputted alternating current 11 may be rectified via high recovery speed diodes. In one aspect, diode array 15 may be rated at, for example, 1200V, 60 A with a reverse recovery time of 30 ns and a speed for fast recovery=<500 ns and =>200 mA. In one aspect, adding diodes (not shown) to diode array 15 may allow the system to handle higher voltages.

One aspect of the present invention may include secondary capacitor bank 46, which may suppress arcs that may be created by the electric field between the plates of secondary capacitor bank 46. Secondary capacitor bank 46 may be coupled to both ends of secondary winding 1. In further aspects, secondary capacitor bank 46 may be coupled to ground 47. Secondary capacitor bank 46 may include a single capacitor or several capacitors coupled in various arrangements. In one aspect, secondary capacitor bank 46 may include polymeric capacitors arranged in series. In further aspects, secondary capacitor bank 46 may include about 31 polymeric capacitors arranged in series. In one aspect, such polymeric capacitors may be rated at 2000V at 0.1 SMFD. In other aspects, more or less polymeric capacitors may be used in secondary capacitor bank 46. In other aspects, secondary capacitor bank 46 may include polymeric capacitors arranged in parallel. In further aspects, secondary capacitor bank 46 may include polymeric capacitors arranged in parallel and series. In further aspects, secondary capacitor bank 46 may be variable, in order to adjust the resonance of the system.

In one aspect, the ends of secondary winding 1 may form the plates of secondary capacitor bank 46. In another aspect, conductive plates may be affixed to the ends of secondary winding 1 to form the plates of secondary capacitor bank 46. In further aspects, a dielectric media may be inserted between the plates to control the capacitance value. The plate distance may be varied or aligned to change the capacitance value, thereby adjusting the resonant frequency. In further aspects, a Faraday cage type enclosure 104 may operate as one plate of secondary capacitor bank 46 and the other capacitor plate may be the charged surface area on secondary winding 1. In one aspect, this may, for example, prevent the electric field from leaving the caged part of the system.

In one aspect, the ends of secondary winding 1 may be formed into capacitor plates by bending them together into a toroidal shape or such that secondary winding 1 has a self capacitance between induced voltage potential between the ends of secondary winding 1 (for example, the wire secondary winding 1 is made of toroids, or flat non-closed rings (not illustrated) around the ends of secondary winding 1 may work as capacitor plates for secondary capacitor bank 46). In other aspects, the ends of secondary winding 1 may be formed in a solenoidal orientation.

Further aspects may have atmosphere 9 stored in container 103. Atmosphere 9 may surround an area including at least secondary winding 1. Container 103 may be a chamber of a low pressure vacuum or other gas-tight container. Atmosphere 9 may include the gas sulfur hexafluoride, in order to reduce arcing.

In further aspects, output winding 10 and optional output winding 7 may be wrapped helically such that magnetic flux 12 may induce voltages on output winding 10 and optional output winding 7. Once induced, output winding 10 and optional output winding 7 may output alternating current 11 and 8, respectively. In further aspects, each turn of output winding 10 may be wrapped directly adjacent to the respective consecutive turn of output winding 10 and each turn of output winding 10 may be approximately concentric with the turns of secondary winding 1. In further aspects, the turns of output winding 10 may be wrapped such that they cover the surface area of secondary winding 1 and are approximately concentric with the turns of secondary winding 1. Optional output winding 7 may be wrapped in a similar fashion to output winding 10.

In one aspect, primary winding 2, output winding 10, and optional output winding 7 may be composed of 10 awg copper litz wire. In further aspects, secondary winding 1 may be composed of 26 awg copper litz wire. In other aspects, common wiring material used in the implementation or construction of coils and transformers may be used for windings 1, 2, 7, and 10. Other aspects may use other materials and other gauge wire for windings 1, 2, 7, and 10. In one aspect, primary winding 2 may have about five turns; secondary winding 1 may have about 1200 turns; output winding 10 may have about five turns; and optional output winding 7 may have about five turns. In other aspects, different number of turns may be used.

In one aspect, core form 6, primary form 13B, output form 13A, and optional output form 13C may be composed of, for example, ceramic, plastic, Plexiglas®, plastic forms made of plastics with magnetic memory and magnetic hysteresis capabilities, a material having a relative magnetic permeability greater than 1, or any other insulating or nonconductive (for example, dielectric) material. In further aspects, core form 6, primary form 13B, output form 13A, and optional output form 13C are shaped as hollow tubes. Core form 6 may include gap 14. One of ordinary skill in the art may calculate the size of gap 14 by taking into account physical dimensions and geometry of core form 6; voltage developed between the ends of secondary winding 1, i.e., between the capacitor plates, and permittivity of media between capacitor plates.

In one aspect, secondary winding 1 is wrapped around core form 6. Primary form 13B, output form 13A, and optional output form 13C surround segments of core form 6 where, respectively, primary winding 2, output winding 10, and optional output winding 7 will be located. Primary winding 2 is wrapped around primary form 13B, output winding 10 is wrapped around output form 13A, and optional output winding 7 is wrapped around optional output form 13C.

In further aspects, core form 6 may have a tubular diameter of about four inches. In further aspects, primary form 13B, output form 13A, and optional output form 13C may have tubular diameters of about six inches. In other aspects, other sized forms may be used. In one aspect, primary form 13B, output form 13A, and optional output form 13C use a structural support, such as pegs, made of a material of which those forms may be composed, to orient primary form 13B, output form 13A, and optional output form 13C such that those forms approximately evenly surround segments of core form 6. In other aspects, core form 6, primary form 13B, output form 13A, and optional output form 13C are a single form.

As shown in FIG. 1C, one aspect of the present invention may include resonant transformer 101 in solenoidal form. In one aspect, core form 6 and primary form 13A may be formed in a cylindrical shape. In other aspects, other shapes may be used. In further aspects, core form 6 may be located approximately concentrically within output form 13A. Primary winding 2 may be helically wrapped around the inside of core form 6 and both ends of primary winding 2 may be coupled to driving system 102. Secondary winding 1 may be helically wrapped around the outside of core form 6. Output winding 10 may be helically wrapped around the outside of output form 13A. Both ends of output winding 10 may be coupled to rectifying circuitry 15 and capacitor bank 17. Secondary winding 1 may have both ends coupled to secondary capacitor bank 46. Secondary capacitor bank 46 may be coupled to ground 47. Core form 6, output form 13A, primary winding 2, secondary winding 1, and output winding 10 may be made of the same materials as described above in FIG. 1A according to aspects of the present invention. Optional output windings (not shown) may also be used.

In another aspect, another cylindrical-shaped form (not shown) may approximately concentrically surround core form 6 and be approximately concentrically located within output form 13A. In this aspect, primary winding 2 may be helically wrapped around core form 6; secondary winding 1 may be helically wrapped around the additional cylindrical-shaped form (not shown); and output winding 10 may be helically wrapped around the outside of output form 13A.

As shown in FIG. 1D, one aspect of the present invention may include form of high permeability material 106 (for example, iron, Mu metal, HyMu80) in core form 6. In one aspect, if resonant transformer 101 is in solenoidal form, then the form of high permeability material 106 may be in a cylinder of high permeability material. Form of high permeability material 106 may be solid. In another aspect, form of high permeability material 106 may be hollow, such as, a sheet of such material wrapped into a cylindrical form. In other aspects, form of high permeability material 106 may be formed in shapes other than a cylinder. In another aspect, form of high permeability material 106 is shaped to fit inside and/or mirror the curved structure of core form 6 (as shown in one aspect according to FIG. 1A).

Figure 2:
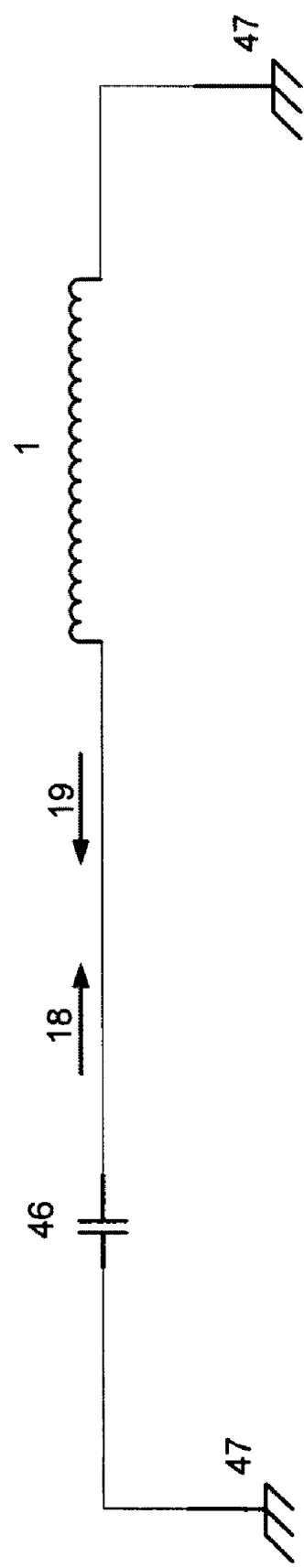
FIG. 2 illustrates a schematic showing a current flow in a resonant transformer according to one aspect of the present invention.

As shown in FIG. 2 according to one aspect of the present invention, a resonating system may be formed when both ends of secondary winding 1 and secondary capacitor bank 46 are coupled to grounds 47. In other aspects, both ends of secondary winding 1 and secondary capacitor bank 46 may be floating, that is, they may not be coupled to grounds 47. Such a resistor inductor capacitor forming a resistive, capacitive, and inductive circuit (RLC circuit) (whether floating according to one aspect, or coupled to grounds 47 according to another aspect) may resonate with a frequency of one over two pi times the square root of secondary winding 1 inductance times the capacitance of secondary capacitor 46 [i.e. $f=1/(2\pi*(LC)^{(1/2)})=1/(2\pi*(L_{sw1}*C_{SC46})^{(1/2)})$] and determines the necessary driving frequency.

Figure 4:
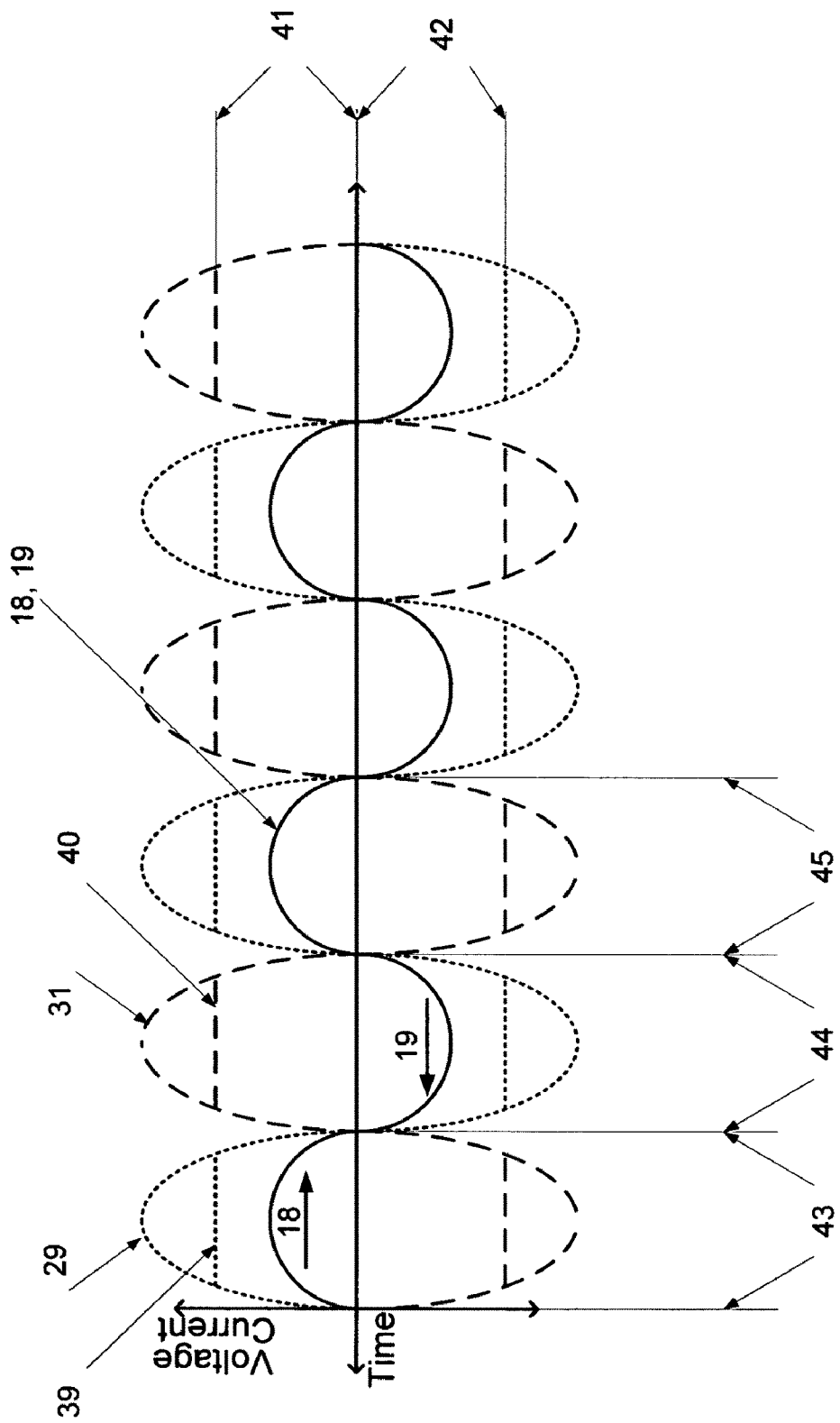
FIG. 4 illustrates a timing diagram of a driving system as applied to a resonant transformer according to one aspect of the present invention.

In further aspects, the resonating RLC circuit may create currents 18 and 19. One of currents 18 and 19 may be created for every magnetic flux cycle created by the RLC resonant circuit. As shown in FIG. 4 according to one aspect of the present invention, currents 18 and 19 may be graphed as a function of time.

FIG. 3A illustrates a driving system according to one aspect of the present invention. One aspect may include a transistor driving system that may use a feedback signal from feedback windings 33, 34, 36 and 37 (as shown in figure FIG. 3B according to one aspect of the present invention) of resonant transformer 101 to control IGBTs 24, 25, 26 and 27. In further aspects, feedback windings 33, 34, 36, and 37 may not generate the same signal simultaneously, as, for example, two of feedback windings 33, 34, 36, and 37 may be reversed, have their signal inverted, or have their polarity changed between signal and ground to generate a waveform as described in FIG. 4 according to one aspect of the present invention.

In one aspect, transformer 105 (as shown in FIG. 1A according to one aspect of the present invention) may be a feedback transformer including core 48, additional winding 35, and feedback windings 33, 34, 36, and 37. Transformer 105 may sense currents 18 and 19 from secondary winding 1 and feed currents 18 and 19 into IGBTs 24, 25, 26, and 27. In further aspects, transformer 105 including core 48, winding 35, and feedback windings 33, 34, 36, and 37 may be imposed between ground 47 and secondary winding 1 (for example, between secondary capacitor bank 46 and one end of secondary winding 1).

In another aspect, transformer 105 may be a current transformer. Such a current transformer may be used as an alternative to feedback windings 33, 34, 36, and 37 in order to sense currents 18 and 19. Such an aspect may not directly couple to secondary winding 1 and may not use additional winding 35 or core 48. Other aspects may sense currents 18 and 19 for acquisition of timing signals for feedback to the driving circuit 102.

In further aspects, an initial timing signal, part of driving system 102, may be provided to IGBTs 24, 25, 26 and 27. This timing signal may match the resonant frequency of resonant transformer 101. A timing signal may be provided to IGBTs 24, 25, 26, and 27 until timing signals from transformer 105 are acquired. Circuitry that may provide a timing signal may include different types of waveforms (for example, sinusoidal, square-wave, triangle wave, etc.) at the resonant frequency. In one aspect, a JK flip-flop may be used to generate the initial timing signal. In one aspect, a hex Schmitt Trigger and CMOS Dual J-K M-S Flip-Flop may be used to generate the initial timing signal. In other aspects, such a timing signal may be used with driving circuitry as described in U.S. non-provisional patent application Ser. No. 12/288,586, titled "Methods and Systems for Wireless Energy and Data Transmission," filed Oct. 21, 2008.

Further aspects may include an H-bridge made with four IGBTs 24, 25, 26 and 27 with a power source 32. The gate to emitter voltage in both directions on all four IGBTs 24, 25, 26 and 27 may be limited by diode arrays comprised of diodes 20, 21, 22, and 23, respectively. In such aspects, IGBTs 20 and 23 may be, for example, high speed or Schottky type diodes and diodes 21 and 22 may be, for example, ~10 v-30 v voltage limiting or Zener diodes. In further aspects, periodic signals 28, 29, 30, and 31 may be sent to IGBTs 24, 25, 26 and 27.

Figure 3B:
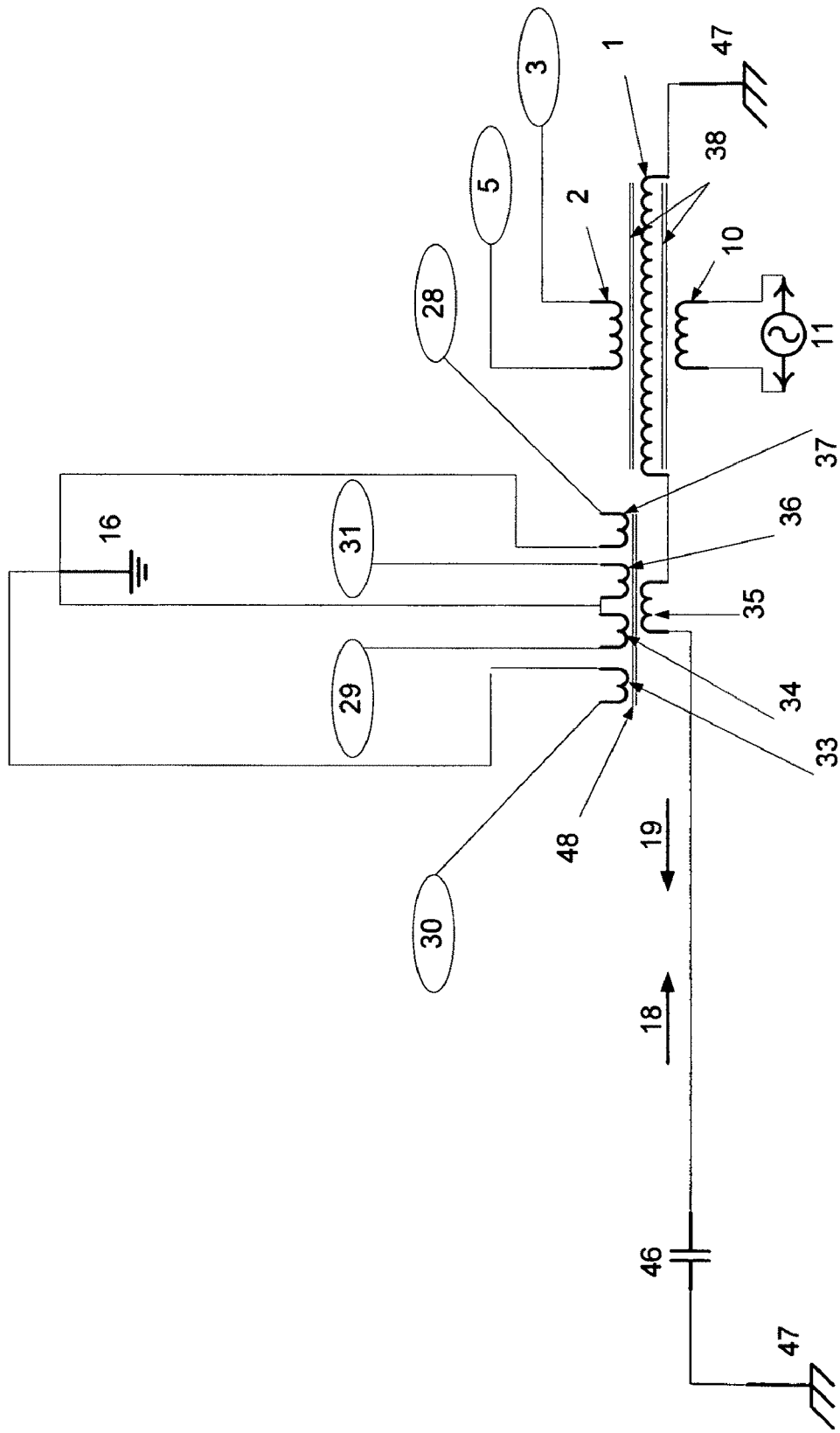
FIG. 3B illustrates a schematic diagram of a resonant transformer system, with representation of a feedback interface to a driving system according to one aspect of the present invention.

As shown in FIG. 3B, one aspect of the present invention may include additional winding 35. In further aspects, transformer 105 may sense the frequency of secondary winding 1 and provide feedback in the form of periodic signals 28, 29, 30, and 31 to driving system 102 and, thereby, providing a timing signal to driving system 102 that provides alternating current 4 to primary winding 2. Further aspects may include at least one additional winding 35 (for example, about 1-2 turns for additional winding 35) and at least one other winding, such as, feedback windings 33, 34, 36 and 37 (for example, about 5-50 turns for each feedback winding 33, 34, 36, and 37) wrapped around core 48 (such as, toroidal air core resonator or ferrite core). Another aspect may include non-conductive form 38 to prevent arcing between secondary winding 1 and solid state driving terminals 3 and 5. In another aspect, non-conductive form 38 may be composed of a material having a relative magnetic permeability greater than 1. In other aspects, different numbers of turns may be used.

In one aspect, feedback windings 33, 34, 36, and 37 may be composed of 20 awg copper wire and additional winding 35 may be composed of the same wire as secondary winding 1. In other aspects, common wiring material used in the implementation or construction of coils and transformers may be used for feedback windings 33, 34, 36, and 37 and additional winding 35. Other aspects may use other materials and other gauge wire for feedback windings 33, 34, 36, and 37 and additional winding 35.

In further aspects, a self resonating system may be achieved when secondary capacitor bank 46 and secondary winding 1 resonate with sufficient energy to send currents 18 and 19 through additional winding 35 to induce periodic signals 28, 29, 30, and 31, to drive IGBTs 24, 25, 26 and 27 gates such that they may become conductive from collector to emitter.

As shown in FIG. 4, one aspect of the present invention may include driving periodic signals 31 and 29 with voltage limits 40 and 39, created by voltage values 41 and 42, which may be the sum of the forward voltage drop over diodes 20 and 23 (as shown in FIG. 3A according to one aspect of the present invention) plus reverse bias Zener voltage over Zener diodes 21 and 22, (as shown in FIG. 3A according to one aspect of the present invention) respectively. Driving periodic signals 31 and 29 may appear similar to one another over time on the graph (as shown in FIG. 4 according to one aspect of the present invention) according to one aspect with respect to the gate and emitter voltage over a given 24 and 26 IGBT (as shown in FIG. 3A according to one aspect of the present invention). In further aspects, periodic signals 31 and 29 may have a one pi radian phase shift with respect to time. Within change in time 43, driving periodic signal 29 may turn on IGBT 25, driving periodic signal 30 may turn on IGBT 26, driving periodic signal 31 may turn off IGBT 27, and driving periodic signal 28 may turn off IGBT 24. Within change in time 44, driving periodic signal 29 may turn off IGBT 25, driving periodic signal 30 may turn off IGBT 26, driving periodic signal 31 may turn on IGBT 27, and driving periodic signal 28 may turn on IGBT 24. Within change in time 45, driving periodic signal 29 may turn on IGBT 25, driving periodic signal 30 may turn on IGBT 26, driving periodic signal 31 may turn off IGBT 27 and driving periodic signal 28 may turn off IGBT 24. In further aspects, this cycle may repeat itself, driving IGBTs 24, 25, 26 and 27.

In further aspects, driving periodic signals 28, 29, 30, and 31 may drive transistors (for example, IGBTs 24, 25, 26 and 27) that bridge a direct current bus, which may create the driving waveform (as shown according to one aspect, for example, waveform including alternating current 4, as shown in FIG. 1 according to one aspect of the present invention) that drives a primary system (for example, primary winding 2) at the resonant frequency directly, creating a type of closed loop system.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

What is claimed is:

1. A method of operating a resonant transformer, comprising:
   (a) initiating a first timing signal within a driver;
   (b) inputting power to the driver;
   (c) inducing a first alternating current into a primary winding, wherein the first alternating current is generated by the driver;
   (d) electromagnetically coupling the primary winding to a secondary winding;
   (e) storing energy, wherein the energy comprises an electric field between the plates of a first capacitor bank;
   (f) generating a second alternating current on the secondary winding at a frequency governed by an RLC circuit, wherein the RLC circuit includes the secondary winding and the first capacitor bank;
   (g) sensing the frequency of the second alternating current on the secondary winding;
   (h) sending a second timing signal to the driver based on the frequency of the second alternating current on the secondary winding, wherein the driver provides the first alternating current into the primary winding based on the second timing signal;
   (i) electromagnetically coupling at least one output winding to the secondary winding; and
   (j) outputting a third alternating current from the output winding into a rectifying circuitry.

2. The method of claim 1, further comprising:
   (k) rectifying the third alternating current into a direct current;
   (l) reducing ripples on the direct current; and
   (m) transmitting the direct current.

3. The method of claim 2, wherein the first capacitor bank includes polymeric capacitors.

4. The method of claim 2, wherein the rectifying the third alternating current into the direct current is done through a rectifying circuit and a second capacitor bank.

5. The method claim 1, wherein the driver includes a feedback system and insulated gate bipolar transistors in an H-bridge configuration.

6. A resonant transformer system, comprising:
   a secondary winding wrapped around a core form and having first and second ends coupled to a secondary-capacitor bank, wherein the core form is toroid-shaped with a gap;
   a primary winding wrapped around a primary form and having first and second ends coupled to a driver, wherein the primary form surrounds a portion of the core form;
   at least one output winding wrapped around an output form and having first and second ends coupled first and second inputs of a rectifying circuitry respectively, wherein a first output of the rectifying circuitry is coupled to one or more capacitors through a first terminal of the one or more capacitors and a second output of the rectifying circuitry is connected to the one or more capacitors through a second terminal of the one or more capacitors, and the output form surrounds a portion of the core form; and
   a transformer coupled to the secondary winding.

7. The system of claim 6, wherein the secondary capacitor bank is coupled to a ground.

8. The system of claim 6, wherein the core form includes a layer of a high permeability material.

9. The system of claim 6, wherein the secondary capacitor bank includes polymeric capacitors.

10. The system of claim 6, wherein the one or more capacitors includes one or more snubber capacitors, low inductance polymeric capacitors, and electrolytic capacitors.

11. The system of claim 6, wherein the rectifying circuitry includes a diode array.

12. The system of claim 6, further comprising a gas-tight container surrounding the core form, primary form, and output form.

13. The system of claim 12, wherein the gas-tight container includes a gas with a high-dielectric atmosphere.

14. The system of claim 12, wherein the gas-tight container is a vacuum.

15. The system of claim 6, further comprising a Faraday cage surround the core form, primary form, and output form.

16. The system of claim 6, wherein the transformer is a feedback transformer.

17. A resonant transformer system, comprising:
   a secondary winding wrapped around a core form and having first and second ends coupled to a secondary capacitor bank, wherein the core form is cylinder-shaped;
   a primary winding wrapped around the inside of the core form and having first and second ends coupled to a driver;
   at least one output winding wrapped around an output form and having first and second ends coupled first and second inputs of a rectifying circuitry respectively, wherein a first output of the rectifying circuitry is coupled to one or more capacitors through a first terminal of the one or more capacitors and a second output of the rectifying circuitry is connected to the one or more capacitors through a second terminal of the one or more capacitors, and the output form surrounds a portion of the core form; and
   a transformer coupled to the secondary winding.

18. The system of claim 17, wherein the core form surrounds a high permeability material.

19. The system of claim 17, further comprising a gas-tight container surrounding the core form, primary form, and output form.

20. The system of claim 19, wherein the gas-tight container includes a gas with a high-dielectric atmosphere.

21. The system of claim 17, further comprising a Faraday cage surround the core form, primary form, and output form.

22. The system of claim 17, wherein the transformer is a feedback transformer.

* * * * *